3,010,961
BASICALLY SUBSTITUTED DERIVATIVES OF 11H-QUINOXALINO [2.3-b]-p-BENZOTHIAZINES
Walter Schindler, Riehen, near Basel, and Hans Jakob Peterli, Munchenstein, Basel Land, Switzerland, assignors to Geigy Chemical Corporation, Ardsley, N.Y., a corporation of Delaware
No Drawing. Filed Jan. 20, 1960, Ser. No. 3,483
Claims priority, application Switzerland Jan. 21, 1959
7 Claims. (Cl. 260—243)

The present invention concerns new heterocyclic compounds which have valuable pharmacological properties, as well as processes for the production thereof.

Basically substituted derivatives of 11H-quinoxalino-[2.3-b]-p-benzothiazine have not been known up to now. It has now been found that N-derivatives of such compounds corresponding to the general formula

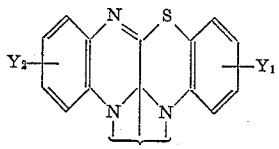

radical Z—Am at a nitrogen atom and additional linkage from C atom to the other nitrogen atom wherein $Y_1$ and $Y_2$ represent hydrogen or halogen atoms, in particular chlorine or bromine, Z represents an alkylene radical having 2–6 carbon atoms of which 2–4 are in the direct linkage between N and Am, and Am represents a low molecular dialkylamino group, and wherein one of the two alkyl radicals of Am and the alkylene radical Z or both alkyl radicals can be bound to each other direct or by way of an oxygen atom, an alkylimino, hydroxyalkylimino or alkanoyloxyalkylimino group, have valuable pharmacological properties, in particular anti-allergic, serotonin-antagonistic, anti-convulsive, adrenolytic and sedative activity. They are useful for the treatment of mental disorders as well as for the potentiation of the action of other pharmaceuticals, in particular of anaesthetics.

The new compounds are produced by reacting an 11H-quinoxalino[2.3-b]-p-benzothiazine of the general formula

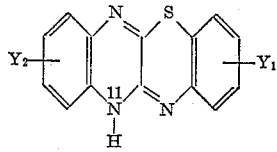

II in the presence of a condensing agent, with a reactive ester of an amino alcohol of the general formula HO—Z—Am   III wherein $Y_1$, $Y_2$, Z and Am have the meanings given above.

Sodium amide, lithium amide, potassium amide, sodium or potassium, butyl lithium, phenyl lithium or lithium hydride are particularly suitable condensing agents. The reaction can be performed in the presence or absence of an inert organic solvent, of which benzene, toluene and xylenes can be named as examples.

Particularly the halides are used as reactive esters of amino alcohols of the general Formula II; individually can be named:

Dimethylaminoethyl chloride, diethylaminoethyl chloride, methylethylaminoethyl chloride, β-dimethylaminopropyl chloride, β-dimethylamino-isopropyl chloride, γ-dimethylaminopropyl chloride, δ-dimethylamino-butyl chloride, α-methyl - γ - dimethylamino-n-amyl chloride, β-(di - n - propylamino)-ethyl chloride, β-(methyl-isopropylamino)-ethyl chloride, β-(di-n-butylamino)-ethyl chloride, β-(diisobutyl-amino)-ethyl chloride, pyrrolidino ethyl chloride, piperidino ethyl chloride, γ-piperidino propyl chloride, morpholino ethyl chloride, β-(4-methyl-piperazino) - ethyl chloride, β-(4-acetoxyethyl - piperazino)-ethyl chloride, γ - (4 - acetoxyethyl-piperazino)-propyl chloride and 1-methyl-piperidyl-(3)-methyl chloride as well as the corresponding bromides and iodides.

11H-quinoxalino[2.3-b]-p-benzothiazine was first produced by G. Walter, R. Hübsch and H. Pollak, Monatsh. f. Chemie 63, 186 (1933), by reacting 2-aminothiophenol with 2.3-dichloroquinoxaline. If, instead of 2-aminothiophenol, a halogen substituted compound, for example 2-amino-5-chlorothiophenol, and/or a 2.3-dichloroquinoxaline halogen substituted in the benzene nucleus is/are used as starting compounds, halogen substituted 11H-quinoxalino[2.3-b]-p-benzothiazines such as, e.g., 3-chloro-11H-quinoxalino[2.3-b]-p-benzothiazine, are obtained in an analogous manner.

In addition, the new heterocyclic compounds of the general Formula I are also produced by reacting a reactive ester of a compound of the general formula

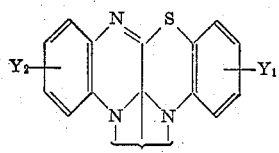

IV radical —Z—OH at a nitrogen atom and additional C—N linkage from C atom to the other nitrogen atom in particular a halide, with a secondary amine of the general formula Am—H   V wherein $Y_1$, $Y_2$, Z and Am have the meanings given above, there being naturally no linkage between an alkyl radical of Am and Z. The reaction can be performed for example at a moderately raised temperature of e.g. 80–120°, in an inert solvent such as, e.g., a low molecular alkanol or alkanone; advantageously an excess of the amine to be reacted is used as acid binding agent. Sometimes the reaction is performed in a closed vessel depending on the boiling point of the amine and solvent used and also on the reaction temperature necessary. Reactive esters of compounds of the general Formula III are obtained, for example, by reacting alkali metal compounds with alkylene oxides and reacting the hydroxyalkyl derivatives obtained with inorganic acid halides, methane sulphonic acid chloride or aryl sulphonic acid chlorides, whereupon x-halogen alkyl-, x-methane sulphonyloxyalkyl- or x-arylsulphonyloxyalkyl-xH-quinoxalino [2.3-b]-p-benzothiazines are obtained. Herein "x" represents one of the positions 11 and 12. The above mentioned compounds are reacted, for example, with dimethylamine, methylethylamine, diethylamine, di-n-butylamine, pyrrolidine, piperidine, morpholine, 4-methyl piperazine or 4-acetoxyethyl piperazine.

Finally compounds of the general formula

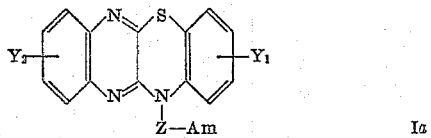

wherein $Y_1$, $Y_2$, Z and Am have the meanings given above, are obtained by condensing an N-substituted o-aminothiophenol of the general formula

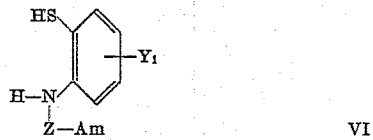

with a 2.3-dichloroquinoxaline of the general formula

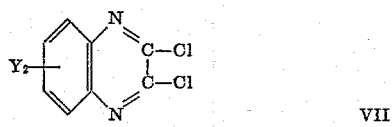

the condensation being performed in the presence of an acid binding agent, or condensing the thiophenol of the general Formula VI above with a 2.3(1H.4H)-dioxoquinoxaline of the general formula

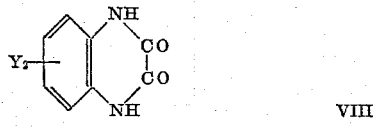

These condensations are performed, for example, in a higher boiling organic solvent such as o-dichlorobenzene at or in the region of its boiling temperature. For example, sodium or potassium carbonate can be used as acid binding agent and the water formed in the reaction thereof with the hydrogen chloride liberated is, for example, azeotropically distilled off.

The tertiary bases form salts some of which are water soluble with organic or inorganic acids such as hydrochloric acid, hydrobromic acid, sulphuric acid, phosphoric acid, methane sulphonic acid, ethane disulphonic acid, acetic acid, succinic acid, fumaric acid, maleic acid, malic acid, tartaric acid, citric acid, benzoic acid, mandelic acid and phthalic acid.

The following examples further illustrate the production of the new compounds. Parts are given therein as parts by weight and their relationship to parts by volume is as that of grammes to cubic centimetres. The temperatures are in degrees centigrade.

Example 1

25 parts of 11H-quinoxalino[2.3-b]-p-benzothiazine and 17 parts of γ-dimethylamino-propyl chloride are dissolved in 250 parts by volume of anhydrous benzene and a suspension of 44 parts of sodium amide in toluene is added dropwise while stirring at 50–60°. The reaction mixture is warmed for 1 hour at 60° and then refluxed for 18 hours. After cooling, water is added, the benzene phase is removed and extracted four times with 25 parts by volume of 2 N-hydrochloric acid each time. The combined hydrochloric acid extracts are made alkaline whereupon the x-(γ-dimethylamino-propyl)-xH-quinoxalino[2.3-b]-p-benzothiazine precipitates in the form of yellow crystals. It is filtered off under suction, washed with water and dried. After recrystallising twice from petroleum ether, it melts at 84–85°.

On using the correspondingly basically substituted alkyl chlorides, x-(β-dimethylaminoethyl)-xH-quinoxalino[2.3-b]-p-benzothiazine (M.P. 96°) and x-(γ-morpholino-propyl)-xH-quinoxalino[2.3-b]-p-benzothiazine (M.P. 125°) are obtained in an analogous manner. The hydrochloride of x-(γ-pyrrolidino-β.β-dimethyl-propyl)-xH-quinoxalino[2.3-b]-p-benzothiazine (M.P. 264°) is obtained if the crude base precipitated from the hydrochloric acid extract produced analogously to the above example is taken up in ether and the ethereal solution is treated with hydrogen chloride.

On the other hand, on using 3-chloro-11H-quinoxalino[2.3-b]-p-benzothiazine as heterocycle, x-(γ-dimethylamino - propyl) - 3 - chloro - xH - quinoxalino[2.3 - b]-p-benzothiazine is obtained in an analogous manner. In the above compounds, one of the two positions 11 and 12 is meant by "x." The 11-position of the hydrogen atom in the parent substance is given by G. Walter et al.

Example 2

200 parts of water and 200 parts of 33% caustic soda lye are added while cooling to 76 parts of dimethylaminopropyl chloride-hydrochloride and the liberated base is separated by extraction with benzene. 60 parts of benzthiazolone-2 are added to the anhydrous benzene solution and, at 60°, a suspension of 20 parts of sodium amide in benzene is added. After refluxing for 4 hours, 70 parts of water are added and the benzene phase is separated. After evaporating off the benzene the residue is distilled. The 3-dimethylamino-propyl benzthiazolone-2 boils at 160–162° under 0.03 mm. pressure.

30 parts of potassium hydroxide in 100 parts of ethanol are added to a solution of 38 parts of the above benzthiazolone derivative in 100 parts of ethanol, the addition being made in a nitrogen atmosphere, and then the whole is refluxed for 30 minutes. The mixture is diluted with 30 parts of water, neutralised with concentrated hydrochloric acid and buffered with 10 parts of ammonium chloride. The N-(γ-dimethylamino-propyl)-o-aminothiophenol formed is extracted with ether and condensed direct with 2.3-dichloroquinoxaline.

38.7 parts of the crude product are dissolved in 130 parts of o-dichlorobenzene with 25.8 parts of 2.3-dichloroquinoxaline, 38.7 parts of anhydrous sodium carbonate are added and the whole is refluxed. The water formed is azeotropically distilled off. After cooling, undissolved particles are filtered off and washed with o-dichlorobenbene. The filtrate is extracted with diluted hydrochloric acid, the acid extraction is separated and made alkaline with soda lye. The crystals of 12-(γ-dimethylamino-propyl)-12H-quinoxalino[2.3-b]-p-benzothiazine which precipitate are recrystallised twice from petroleum ether. The solution has a strong green fluorescence. The melting point is 91°.

Of particular value are those compounds according to Formula I wherein $Y_1$ and $Y_2$ each represents hydrogen and Am represents a lower dialkylamino, pyrrolidino or morpholino group.

What we claim is:

1. A member selected from the group consisting of a heterocyclic compound of the formulae

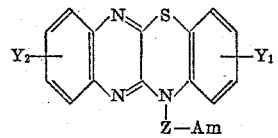

and

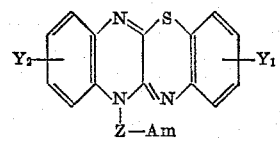

wherein $Y_1$ and $Y_2$ each represent a member selected from the group consisting of hydrogen, a chlorine and bromine atom, Z represents a 2–6 carbon alkylene chain separating the nitrogens to which it is attached by at least 2 carbon atoms, and Am represents a member selected from the group consisting of lower dialkylamino, 1-pyrrolidino, 1-piperidino and 1-morpholino, and the hydrochlorides thereof.

2. 12 - ($\gamma$ - dimethylamino-propyl) - 12H-quinoxalino-[2.3-b]-p-benzothiazine.

3. 11 - ($\gamma$ - dimethylamino - propyl) - 11H - quinoxalino[2.3-b]-p-benzothiazine.

4. 11 - ($\gamma$ - morpholino-propyl) - 11H - quinoxalino-[2.3-b]-p-benzothiazine.

5. 12 - ($\beta$ - dimethylamino - ethyl) - 12H - quinoxalino-[2.3-b]-p-benzothiazine.

6. 12 - ($\gamma$ - morpholino - propyl) - 12H - quinoxalino-[2.3-b]-p-benzothiazine.

7. The hydrochloride of 12-($\gamma$-pyrrolidino-$\beta$.$\beta$-dimethylpropyl)-12H-quinoxalino[2.3-b]-p-benzothiazine.

References Cited in the file of this patent

Kehrmann et al.: Helvetica Chimica Acta, vol. 8, p. 18 (1925).

Walter et al.: Monatsh., vol. 63, p. 187 (1933).